United States Patent [19]

Gruenberg

[11] Patent Number: 4,743,073
[45] Date of Patent: May 10, 1988

[54] HYDRAULIC SYSTEM FOR AUTOMOTIVE VEHICLES

[75] Inventor: Hubertus V. Gruenberg, Bad Homburg, Fed. Rep. of Germany

[73] Assignee: Alfred Teves GmbH, Frankfurt Am Main, Fed. Rep. of Germany

[21] Appl. No.: 32,167

[22] Filed: Mar. 30, 1987

[30] Foreign Application Priority Data

Apr. 17, 1986 [DE] Fed. Rep. of Germany ....... 3612944

[51] Int. Cl.$^4$ ........................................... B60T 17/18
[52] U.S. Cl. ..................................... 303/92; 303/85; 303/114
[58] Field of Search .............................. 60/545, 547.1; 188/151 A, 272; 303/9, 85, 92, 100, 102, 114, 119

[56] References Cited

U.S. PATENT DOCUMENTS 3,924,902 12/1975 Engle ..................................... 303/100
4,610,484 9/1986 Amberg et al. ....................... 303/100
4,653,813 3/1987 Burgdorf ............................ 303/92 X Primary Examiner—Duane A. Reger
Attorney, Agent, or Firm—James B. Raden; Robert P. Seitter

[57] ABSTRACT

A hydraulic system for an automotive vehicle having an auxiliary pressure source and an adjustable suspension device arranged between the vehicle body and the vehicle axle is disclosed. The suspension device includes a working cylinder having a piston chamber and a working piston mounted therein and devices which enable a controlled flow of a pressure medium from one side of the working piston to the other. A separating piston separates the piston chamber from a gas-filled chamber. The suspension device also includes a pressure chamber filled with pressure medium which is separated from the gas-filled chamber by a movable wall and provides for level adjustment of the vehicle body. The pressure chamber of the adjustable suspension device is connectible to the auxiliary pressure source by a pressure line including a changeover valve. The auxiliary pressure source communicates with the wheel brakes of the vehicle by way of a pressure control valve and a pressure modulation valve. Upon failure of the auxiliary pressure source the wheel brakes of the rear wheels can be braked by being connected to the pressure chambers of the adjustable suspension device.

5 Claims, 3 Drawing Sheets

_HYDRAULIC SYSTEM FOR AUTOMOTIVE VEHICLES_

BACKGROUND OF THE INVENTION

This invention relates to a hydraulic system, and in particular a hydraulic system for an automotive vehicle. The system is of the type including a storage and pressure compensation reservoir and a motor operated pump supplying hydraulic fluid to an adjustable suspension means arranged between the vehicle body and the vehicle axle including a working cylinder having a working piston moving therein and having devices enabling a controlled flow of the pressure medium contained in the piston chamber from one side of the working piston to the other side. The working piston is connected with a piston rod extending from one end of the working cylinder. The suspension system to which the invention relates also includes a separating piston separating the piston chamber from a gas-filled chamber, and a second pressure chamber filled with pressure medium is separated from the gas-filled chamber by means of a movable wall.

The German Pulished Patent Application (DE-OS) No. 24 36 216 discloses an adjustable suspension means for vehicles of this general type which has a working cylinder and a piston moving therein and which is provided with devices enabling a pressure medium to flow back and forth in a controlled manner from the one side of the piston to the other. The piston is fastened to a piston rod which protrudes from one end of the working cylinder. This device also includes an outer cylinder which, with the working cylinder, confines an annular reservoir which at least at one end communicates with the working cylinder. The annular reservoir is filled with pressurized gas and pressure fluid with part of the annular reservoir being limited by a flexible wall. Provision is made for connecting a pressure medium line from a component of a level adjusting device of the vehicle to the device. This particular adjustable suspension means has the disadvantage that it requires a pressure medium source of its own and intricate level adjusting valves controlling the admission and discharge of pressure medium in dependence on the respective distance between the vehicle axle and the vehicle body.

Another hydraulic system of the general type to which the invention relates is disclosed in German Patent Specification—DE-PS - No. 30 13 853, which includes an accumulator system for pressurized hydraulic fluid and a plurality of hydraulically operated devices fed by the accumulator system, a hydraulic pump charging the accumulator, and a pressure control unit responding to the accumulator pressure and controlling the charging operation of the hydraulic pump in dependence on two pressure limit values limiting a working pressure range. This hydraulic system is suitable for level adjusting systems and is also suited to simultaneously supply other hydraulically operated components such as hydraulic seat adjusters or window lifters. Accordingly, this hydraulic system is designed such as to automatically shut down less important devices for safety reasons in case of operating troubles, thus allowing the accumulator pressure to be available solely for the device absolutely required for safety such as a servobrake or a power steering system.

SUMMARY OF THE INVENTION

It is thus an object of the present invention to provide for a hydraulic system having an auxiliary pressure source which can supply more than one hydraulically operated device with pressure medium in addition to supply a brake system and which can, in case of a failure of the auxiliary pressure source, feed the pressure medium from one of the additional devices to the brake system.

According to the invention the object is achieved in that the pressure-medium-filled chamber of the adjustable suspension means is connectible to the auxiliary pressure source by way of a pressure line and at least one changeover valve. The auxiliary pressure source communicates with the wheel brakes of the vehicle by way of a pressure control valve and pressure modulation valves.

According to an important feature of the invention, the delivery side of the pump is connected to the booster chamber of a hydraulic booster by way of a pressure control valve. The hydraulic booster is connectible to the wheel brakes thru a brake line and inlet valves controllable by slip monitoring electronics. The pump is also connected with the brake line by way of a pressure line and via a changeover valve. Each brake at the rear of the vehicle includes a directional valve such as a 3/2-way valve or a 2/2-way valve which connects the wheel brake with an outlet valve. The directional valve also is connectible with the pressure chamber of an adjustable suspension means.

Advantageously, the booster chamber of the hydraulic booster is connected to the wheel brakes of the rear wheels through a brake line wherein a pressure modulation valve is connected. At least one branch line of at least one adjustable suspension means is connected with the brake line which leads from the pressure modulation valve to the wheel brakes.

In order to be able to compensate for the quick movements made by the wheel brakes relative to the adjustable suspension means the section of the brake line connecting the wheel brakes with the pressure modulation valves are at least partially designed as a hose or as an elastic connecting tube.

In order to achieve a slim and simple construction of the adjustable suspension means the working piston of the adjustable suspension means, which is connected with the piston rod, and the separating piston which separates the gas-filled chamber from the piston chamber, as well as the piston which separates the gas-filled chamber from the pressure chamber which is connectible to the auxiliary pressure source are all supported coaxially with regard to each other and are longitudinally displaceably within the working cylinder.

BRIEF DESCRIPTION OF THE DRAWINGS

The invention will be described in the Detailed Description of the Preferred Embodiment in conjunction with the drawing in which.

DETAILED DESCRIPTION OF THE PREFERRED EMBODIMENT

Figure 1:
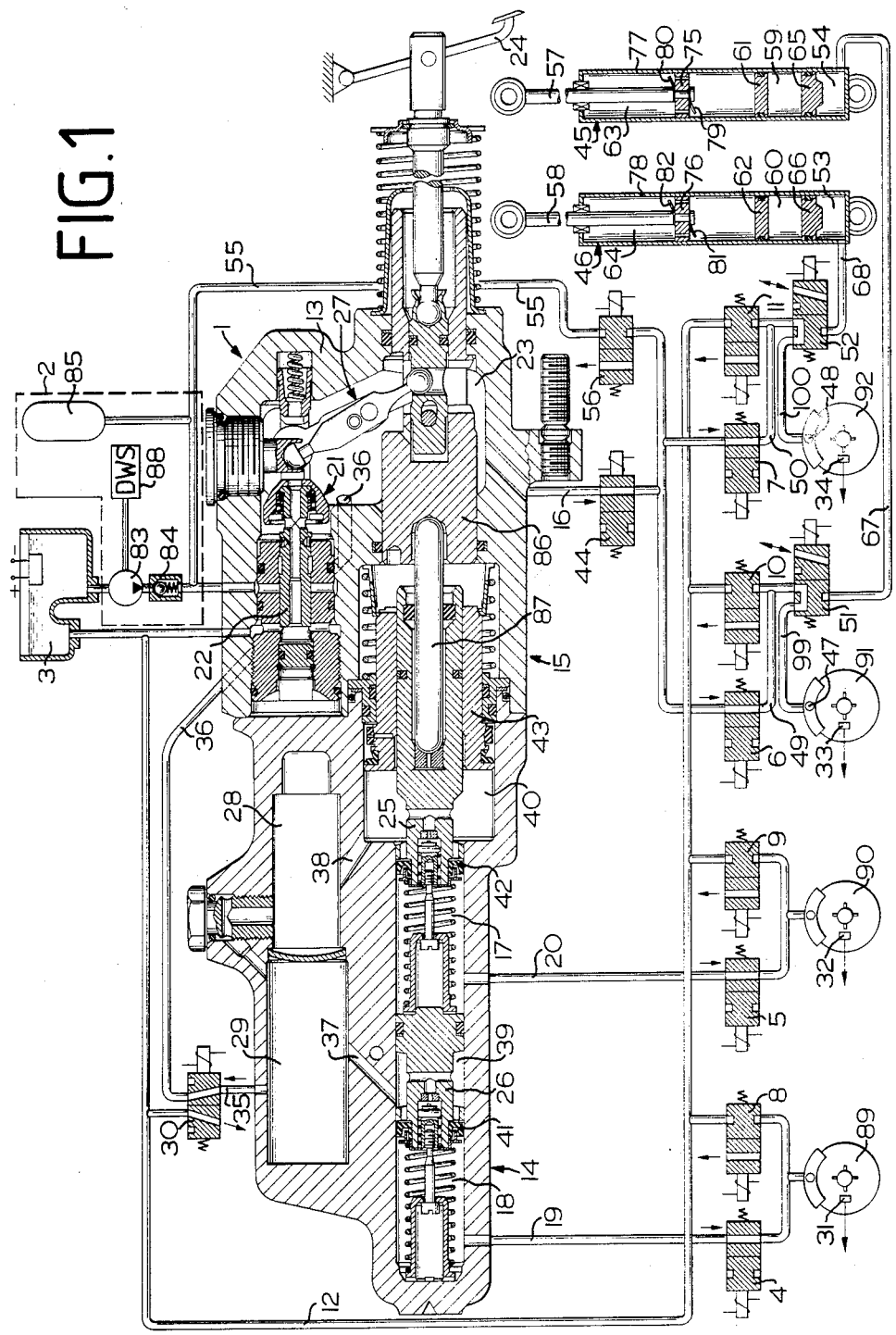
FIG. 1 is a schematic diagram of a hydraulic system including an anti-skid brake system and an adjustable suspension means.

As shown in FIG. 1, the hydraulic system includes a pedal-operated elongated hydraulic braking pressure generator the entire unit of which is marked 1, an auxiliary pressure source 2, a storage and pressure compensation reservoir 3, and electromagnetically operable 2/2-way valves 4, 5, 6 through which valves the first and rear wheel brakes 31, 32, 33, 34 are connected to three hydraulically separated brake circuits 16, 19, 20. The valves 4, 5, 6, 7 are normally in a through position, that is, as long as they are de-energized they are open and allow fluid to pass through. A return line 12 is provided which leads from the front and rear wheel brakes to the compensation reservoir 3. The return line 12, however, is separated from the wheel brake cylinders by four normally closed when deactivated 2/2-way valves 8, 9, 10, 11. The braking pressure generator 1 includes a hydraulic brake booster 13 and a master cylinder arrangement 14 as well as a positioning device 156.

Directly connected to the brake booster 13 is a brake circuit, namely the rear wheel brake circuit 16, while the two working chambers 17 and 18 of the master cylinder arrangement 14, which in the application shown is a tandem master cylinder design, are connected each with one front wheel through separate brake circuits 19 and 20. The two master cylinder brake circuits 19, 20 in this type arrangement are referred to as static pressure medium circuits and the rear axle circuit 16 is referred to as a dynamic pressure medium circuit because the pressure in the circuit 16 is determined by the position of a control valve 21 which is pedal-operated by a linkage arrangement 27. The control valve 21 permits more or less pressure to flow from the auxiliary energy source 2 into the booster chamber 23 and from there into the brake circuit 16 in dependence on the displacement of a valve piston 22 in well known manner.

The pressure built up in the booster chamber 23 as metered by the control valve 21 upon the actuation of a brake pedal 24 simultaneously acts on the pistons 25, 26 of the master cylinder arrangement 14 by way of the booster piston 86 and the actuating rod 87 and—as is well known—brings about a build-up of braking pressure in the working chambers 17 and 18 of the two static brake circuits 19, 20 leading to the front wheels. At first atmospheric pressure prevails in two prechambers 28, 29 of the master cylinder arrangement 14 because in the rest position the chambers 28, 29 communicate with the pressure compensation reservoir 3 through a normally open when de-energized main valve 30.

Provided at each wheel of the vehicle is a sensor 31, 32, 33, 34, for example, an inductive transducer which feeds information on the rotational behavior of the wheels into an electronic control unit not shown. The control unit among other things includes an electronic combinational logic in the form of hardwired or programmable circuits, such as microprocessors, and generates control commands after the evaluation of the sensor signals. The control commands are transferred to the respective solenoid valves 4, 5, 6, 7, 8, 9, 10, 11, 30, 44 over non-illustrated signal lines.

Upon the onset of the brake slip control the main valve 30 is changed over, thereby a pressure medium path 35, 36 is opened which leads from the booster chamber 23 into the prechamber 28, 29, thus pressure medium flows into the prechambers 28, 29. The pressure is transferred to annular chambers 39, 40 within the master cylinder arrangement 14 through connection channels 37, 38. Gaskets 41, 42 arranged at the circumference of the pistons 25, 26 and which function as check valves allow the pressure medium to be fed dynamically from the chambers 39, 40 into the working chambers 17, 18 which communicate with the wheel brakes of the front wheels 89, 90.

At the same time, the pressure dynamically metered in causes resetting of a positioning sleeve 43 of the positioning device 15. Thus, in a known manner, the pistons 25, 26 assume a defined position in the master cylinder arrangement 14.

The dynamic supply of pressure medium into the static brake circuits 19, 20 of the front wheels and into the annular chamber 40 assures that the working chambers 17, 18 will not be controlled empty, even in case of frequent pressure reduction caused by the discharge of pressure medium through the changed-over valves 8 and 9.

Should a defect in the auxiliary energy supply system occur, in this case in the motor driven pump 83 or associated non-return valve 84 or pressure medium accumulator 85, a pressure alarm circuit (not illustrated in detail) responds, signaling the condition to the electric control unit of the hydraulic system which causes a partial or complete cutoff of brake slip control, depending on the level of the residual pressure.

Defects in the dynamic pressure medium path within the braking pressure generator 1, such as a defect in the booster chamber 23 or in the line 36, or a leaking main valve 30, however, are reflected in the distance or position of the positioning sleeve 43. If, for example, a leak or a defect in the pressure medium path prevents dynamic pressure from flowing into the annular chambers 39, 40, during brake slip control, this leads to a reduction in the volume in the working chambers 17, 18 and to a considerable displacement of the positioning sleeve 43 to the left, as viewed in the drawings. Accordingly, as the residual pressure medium volume in the front wheel circuits decreases, a switch 88, opens the signal path from the voltage source and feeds an error signal by way of the input of the electronic control unit. Thereby the valves 4, 5, 6, 7, 8, 9, 10, 11 and the main valve 30 are activated and brake slip control is partially or completely cut off.

Connected in the brake circuit 16 which connects the booster chamber 23 with the wheel brakes of the rear wheels is a 2/2-way valve 56 by way of which the brakes at the rear wheels are also connectible with a pressure line 55 connected to the auxiliary pressure source 2. The connection with the booster chamber 23 can be interrupted by means of a second 2/2-way valve 44 in the brake circuit 16. Additionally, 3/2-way valves 51, 52 are connected in the pressure medium paths 49, 50 connecting the 2/2-way valves 6 and 7, respectively, with the wheel cylinders 47, 48 of the rear wheel brakes. A pressure medium connection can be established between the brake circuit 16 and the pressure chambers 53 and 54 of two adjustable suspension means 45 and 46 by way of the valves 51 and 52, respectively. Each suspension means is supported on the axle of a rear wheel and at the vehicle body. The adjustable suspension means 45, 46 have the design of single-tube shock absorbers and have a biased gas cushion 59, 60 for the purpose of volume compensation of the piston rod 57, 58. Separate pistons 61, 62 separate the gas cushions 59, 60 from the absorber oil in the piston chambers 63, 64. As the pressure of the gas cushions 59, 60 is increased, the advancing force of the piston rods 57, 58 increase. The additional force is used for a level lifting effect. The gas cushions 59, 60 are each separated from the pressure chambers 53, 54 by another piston 65, 66, respectively. The pressure chambers 53, 54 are connected with the 3/2-way valves 51, 52 through the pressure lines 67, 68. Even during driving, the described arrangement permits the level of a vehicle to be adjusted through the wheel pressure modulation valves 6, 7, 10, 11 and through the auxiliary pressure source 2 of the braking pressure generator 1 by changing over the electromagnetically actuatable 3/2-way valves 51, 52.

Figure 2:
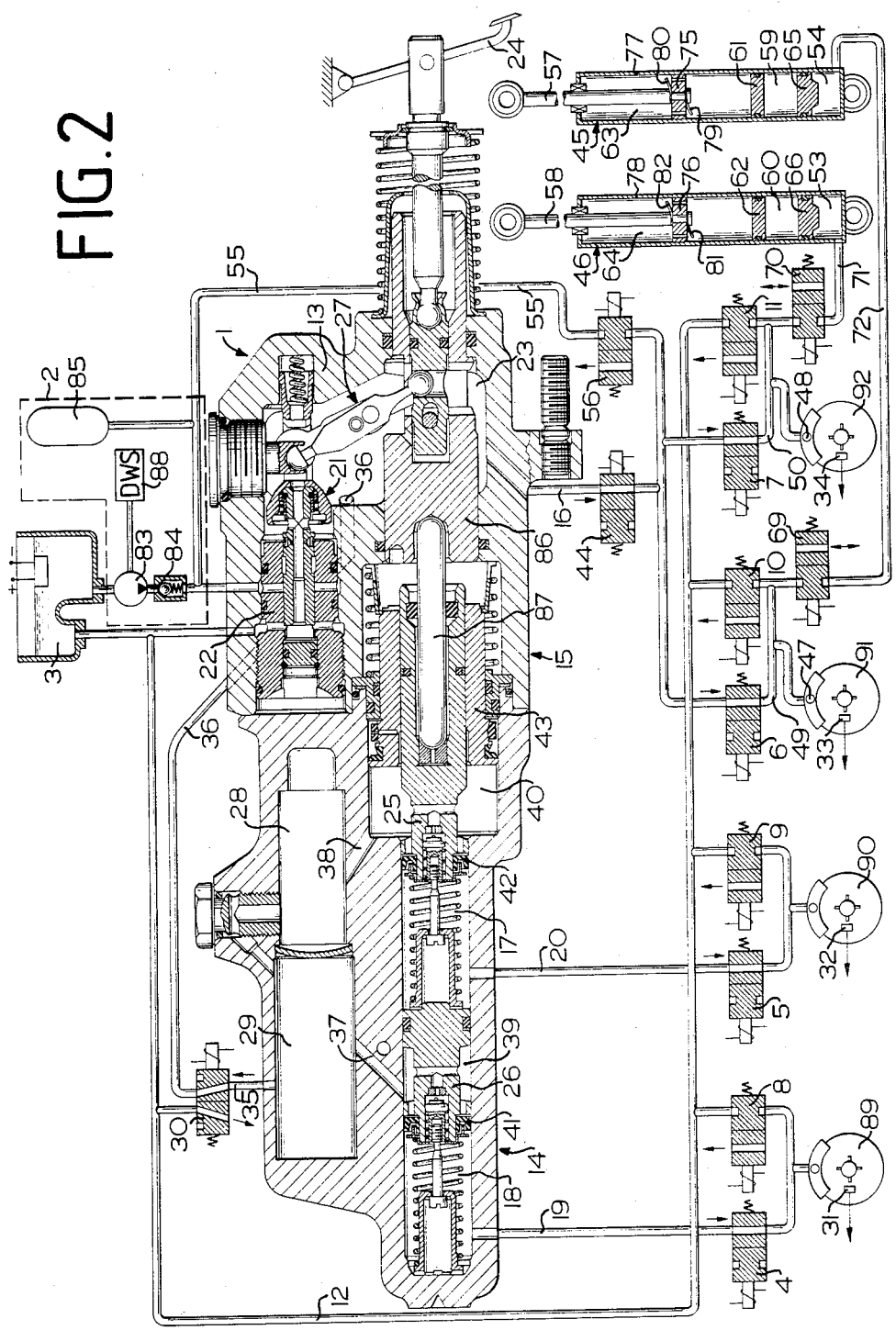
FIG. 2 is a schematic diagram of an alternative embodiment of a hydraulic system according to the invention.

If level adjustment is required only with the vehicle at a standstill, instead of 3/2-way valves 51, 52 2/2-way valves 69, 70 can be used as shown in FIG. 2. This embodiment of the system also permits the auxiliary energy accumulated in the pressure chambers 53, 54 to be used for the actuation of the wheel brakes 91, 92 of the rear wheels upon a failure of either the auxiliary pressure source 2 or the hydraulic brake booster 13 and also can be used for supplying the booster chamber 23 with auxiliary pressure.

Figure 3:
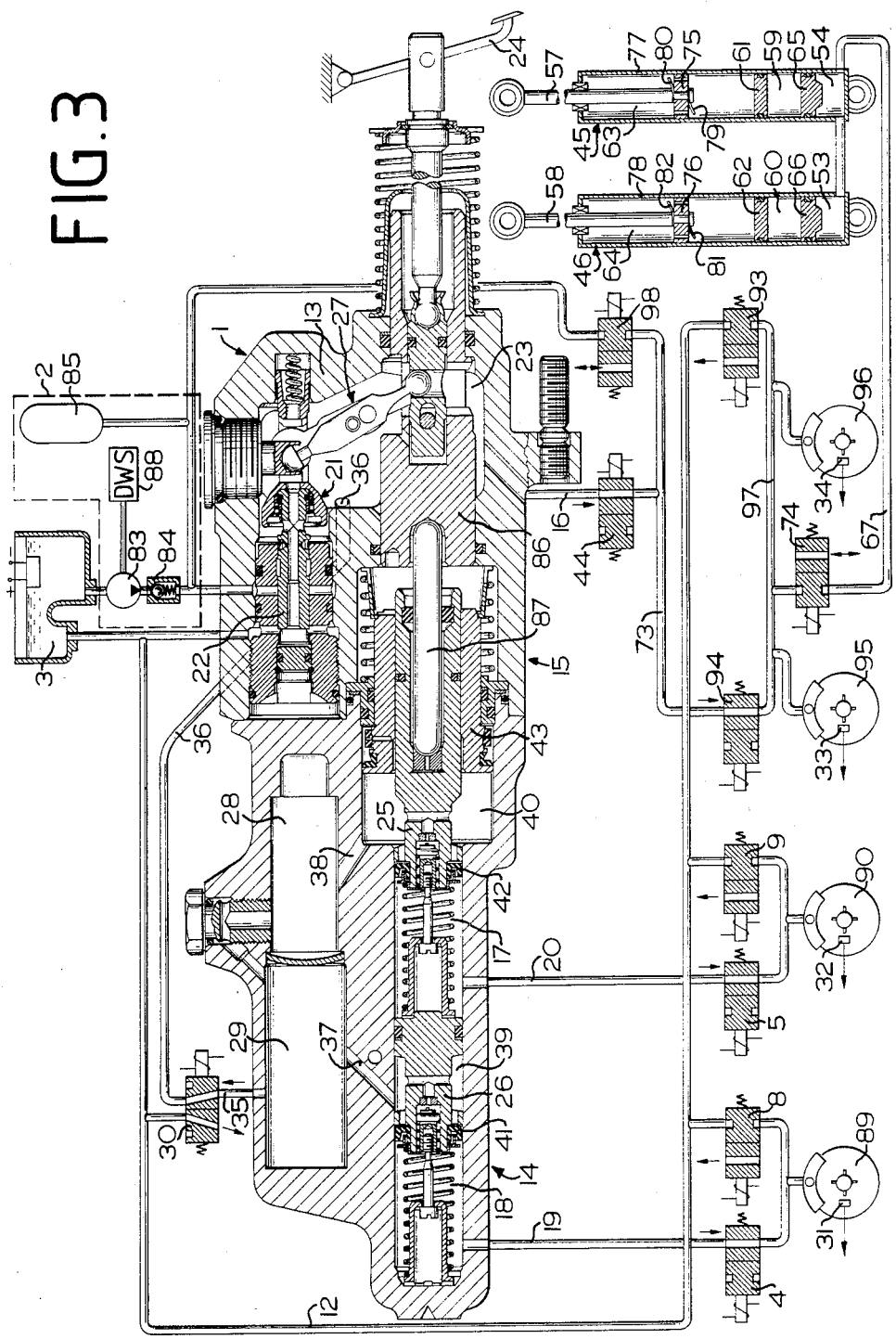
FIG. 3 is the schematic diagram of an alternative embodiment of a hydraulic system similar to that of FIG. 1, wherein the wheel brakes of the rear wheels are jointly controllable.

A further embodiment illustrated in FIG. 3 provides for joint control of the rear wheels by way of a valve pair (94, 93) in case of anti-skid control. In this embodiment, the level adjusting device likewise can work with vehicle at a standstill. In this case, the pressure chambers 53, 54 each are connected to the rear axle brake circuit by way of a single branch line 67, and a 2/2-way valve 74 in said branch line 67. In this arrangement it is also possible to use the energy accumulated in the level lifting elements if there is a failure of the auxiliary energy.

What is claimed is:

1. A hydraulic system for an automotive vehicle, comprising an auxiliary pressure source including a motor driven pump assembly and a storage and pressure compensation reservoir, adjustable suspension means arranged between a body portion of the vehicle and an axle of the vehicle, said suspension means including a working cylinder, defining a piston chamber, a working piston mounted for movement in said piston chamber, said working piston including means for controlling flow of a pressure medium contained in the piston chamber from one side of the working piston to another side of the working piston, the working piston being connected with a piston rod extending out of one end of the working cylinder, a separating piston in the working cylinder separating the piston chamber from a gas-filled chamber, a pressure chamber filled with said pressure medium and separated from the gas-filled chamber a movable wall, the pressure chamber of the adjustable suspension means being connectible to the auxiliary pressure source by a pressure line, and at least one changeover valve being disposed in the pressure line between said auxiliary pressure source and said pressure chamber of said working cylinder, said auxiliary pressure source connected to a wheel brake of the vehicle through a pressure control valve in a hydraulic brake booster and a pressure modulation valve connected between said pressure control valve and a wheel cylinder of said brake.

2. A hydraulic system as claimed in claim 1, wherein a delivery side of the motor driven pump assembly is connected with a booster chamber of the hydraulic booster through the pressure control valve, said hydraulic booster being connectible to two wheel brakes through a brake line, a pair of inlet valves in the brake line, said inlet valves being controllable by slip monitoring electronics, said delivery side further connected with the brake line through a pressure line and a changeover valve disposed in the pressure line between said delivery side and said brake line, a directional valve disposed in a section of the brake line which connects the wheel brake cylinder with an outlet valve in said brake line, said section of said pressure line being connectible through said directional valve with the pressure chamber of said adjustable suspension means.

3. A hydraulic system as claimed in claim 1, wherein the booster chamber of the hydraulic booster is connected to two rear wheel brakes through a brake line including a pressure modulation valve, at least one branch line of at least one adjustable suspension means being connected with a section of the brake line which leads from the pressure modulation valve to the wheel brakes, and a change over valve being in said at least one branch line.

4. A hydraulic system as claimed in claim 3, wherein said section of said brake line between said modulation valve and said wheel brake is an at least partially elastic tube.

5. A hydraulic system as claimed in claim 1, wherein the adjustable suspension means' working piston, which is connected with the piston rod and the separating piston separating the gas-filled chamber from the piston chamber and the separating piston separating the gas-filled chamber from the pressure chamber, are disposed coaxially with regard to each other and are each longitudinally displaceable within the working cylinder.

* * * * *